(No Model.)
S. A. BRUMBAUGH.
AUTOMATIC FEED FOR BORING BARS.
No. 383,210. Patented May 22, 1888.
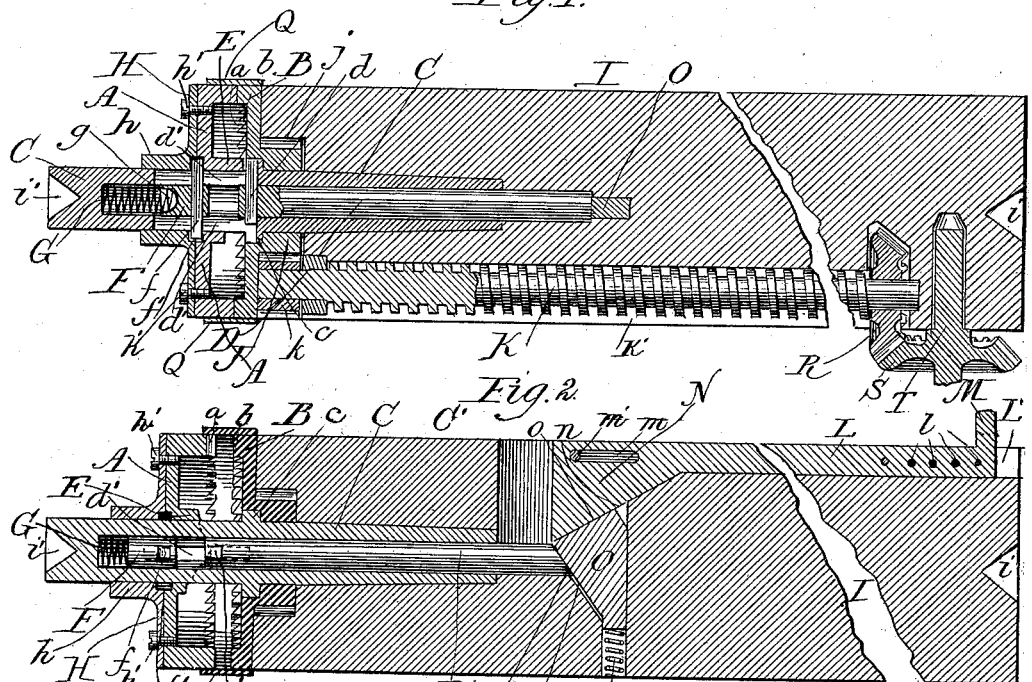
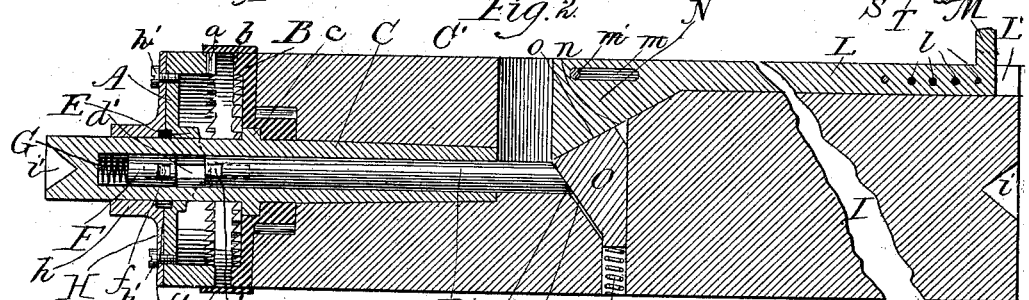
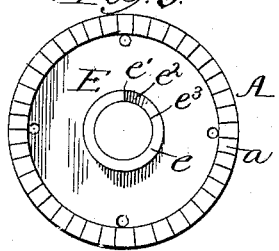
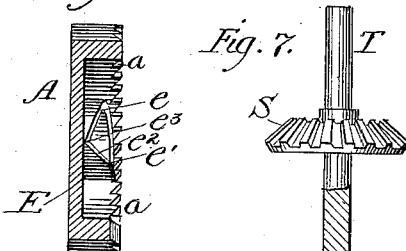
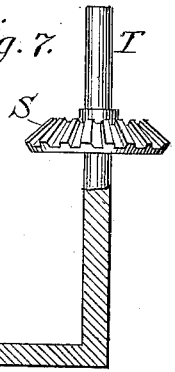
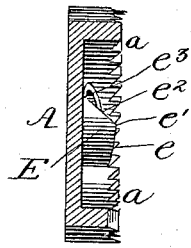
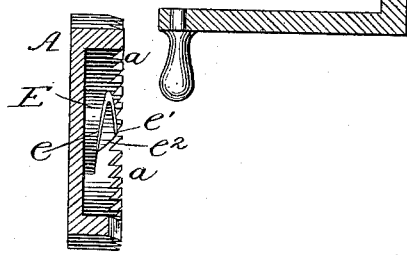
Witnesses:
O. W. Bond
Louisa Brumbaugh
Inventor:
Samuel A. Brumbaugh
N. PETERS, Photo-Lithographer, Washington, D. C.

UNITED STATES PATENT OFFICE.

SAMUEL A. BRUMBAUGH, OF CHICAGO, ILLINOIS.

AUTOMATIC FEED FOR BORING BARS.

SPECIFICATION forming part of Letters Patent No. 383,210, dated May 22, 1888.

Application filed March 5, 1888. Serial No. 266,124. (No model.)

*To all whom it may concern:*

Be it known that I, SAMUEL A. BRUMBAUGH, residing at Chicago, in the county of Cook and State of Illinois, and a citizen of the United States, have invented a new and useful Improvement in Automatic Variable Feed for Boring Bars, of which the following is a specification, reference being had to the accompanying drawings, in which—

Figure 1 is a longitudinal section. Fig. 2 is a longitudinal section in a central plane through Fig. 1; Fig. 3, a face view of the cam plate or disk; Figs. 4, 5, and 6, sectional views of the cam plate or disk, showing the cam from different sides; Fig. 7, an elevation, partly in section, of one of the reversing-gears and its shaft.

The object of this invention is to construct a feed device for a cutter-head by which any required feed can be given to the tool without any particular attention from the operator after the adjustment for the feed is made; and its nature consists in the several parts and combinations of parts hereinafter described, and pointed out in the claims as new.

In the drawings, A represents a clutch plate or disk having a flange at its periphery provided with teeth $a$.

B is a clutch plate or disk having on its face at the periphery teeth $b$ to coact with the teeth $a$ and lock the clutch-disks A B together.

C is a hollow spindle having in line with the disk B a flange or collar, $c$, which, when the parts are together, lies in a countersink at the center of the disk, and having its outer end closed or solid.

D is a sliding rod or pin located in the hollow spindle C, and having at its forward end a pin, $d$, the ends of which project into slots $d'$, formed in the spindle C, which slots also extend into the collar $c$, so that the pin $d$ can lie within the countersink of the disk B, as shown in Fig. 1.

E is a cam formed with or firmly secured to the disk A at the center and encircling the spindle C, and having an acting-face formed of a gradual incline, $e$, an end, $e'$, and an incline, $e''$, leading to a depression, $e^3$.

F is a short sliding pin or block located in the hollow spindle C, and having a pin, $f$, the ends of which project through the slots $d'$ and enter a countersink in the disk A and its face-plate, as shown in Fig. 1.

G is a spring located between the block or pin F and the end wall of the spindle C, and, as shown, the end of F has a recess, $g$, to receive the end of the spring, which permits a longer spring to be used and gives an increased bearing for the pin F.

H is a face or driving plate having a center or hub, $h$, mounted on the spindle C, and this plate H is attached to the disk A by screws $h'$, as shown, or in any other suitable manner. This plate is to be driven from some moving part of the lathe with which the device is used.

I is a stock or bar receiving the spindle C, and on which the cutter-head (not shown) travels, as usual. This bar I at its outer end has a center, $i$, and the outer end of the spindle C has a center, $i'$, by means of which centers $i$ and $i'$ the bar and spindle can be secured properly in the lathe.

J is a gear formed with or suitably secured to the disk B, and mounted with the disk loosely on the spindle, and, as shown, the end of the bar I has an opening, $j$, to receive the gear J.

K is a feed-screw located in a slot in the bar I, and having secured to its forward end a pinion, $k$, to mesh with the gear J. This feed-screw K works in a nut on the cutter-head, as usual, for advancing the head when the gear J and pinion $k$ are rotated.

L is a sliding bar located in a groove, L', in the bar I, and having at its outer end, as shown, a series of holes, $l$, for the passage of a pin to form a lock for the bar L when adjusted in any desired position; but the bar L can be locked by other means. The forward end of the bar L, as shown, has a slot, $m$, to allow the bar to be moved in or out, through which slot, as shown, a pin, $m'$, passes to hold the bar in place; but other means than the slot and pin can be used to hold the bar at this end.

M is a finger-piece on the tail end of the bar L, by means of which the bar can be moved; but an adjusting-nut or other means can be used in place of the finger-piece M.

N is a head on the forward end of the bar

L, having an acting-face, $n$, formed on an incline.

O is a sliding block located in a recess in the bar I to be in line with the head N and tail end of the sliding pin D, and this block has an acting-face, $o$, on an incline to coact with the face $n$ and an acting-face, $o'$, on an incline to coact with the inclined end $p$ of the pin D.

P is a spring for returning the block O, which spring is located in a recess in the bar I.

The parts can be assembled by placing the short pin F, with its spring G, in the spindle C, slipping the disk A, with the cam E, onto the spindle, passing the pin $f$ through the pin F and slots $d'$ for its end to enter the countersink at the center of the disk A, and then slipping the disk or plate H onto the spindle and securing it to the disk A, with the ends of the pin $f$ in the countersinks of the disks A and H, connecting them to the sliding pin F. The rod or pin D is then slipped into the spindle C and the pin $d$ inserted in its end to have the ends of the pin $d$ in the slots $d'$, then slipping the disk B, with the gear J, onto the spindle C for the collar $c$ to enter the countersink of the disk B, and then securing the spindle in the bar I for the gear J to mesh with the pinion $k$ of the screw-feed K and the end $p$ of the sliding pin D to be in contact with the face $o'$ of the block O, the face $o$ of which is in contact with the face $n$ of the block N. The device is then ready for use, the cutter-head being on the exterior of the bar I, as usual.

The pin $d$ is advanced or receded by the sliding pin D, but is non-rotating, and the cam E is rotated with the disk A, which is driven from the disk H. The acting-face $e$ $e'$ $e''$ $e^3$ of the cam E runs in contact with the pin $d$, and the position of the pin $d$ determines the length of engagement of the clutch-disks A and B and the consequent advance of the disk B to operate the feed. The advance of the face $e$ in contact with the pin $d$ gradually draws the disk A away from the disk B, such withdrawal being permitted by the compression of the spring G of the sliding pin F, and such withdrawal will continue until the end $e'$ of the cam is passed and the incline $e''$ comes in contact with the pin $d$, allowing the spring G to act and force the disk A toward and into engagement with the disk B as the depression $e^3$ receives the pin $d$, at which time the clutch-disks A and B are in full engagement, and will so continue until the incline $e$ acts and draws back the disk A to break the engagement.

The length of the continuation of the engagement of the clutch-disks A and B depends on the position of the pin $d$, and this pin is adjusted to the required position by moving the sliding pin D by the bar L, head N, and block O, or other suitable means. The pin $d$, when at its farthest advance, as shown in Fig. 2, stands at a point where the depression $e^3$ engages the pin and holds the clutch-disks A and B out of contact, leaving the disk A free to rotate without rotating the disk B, causing the feed to run empty while setting the cut. The length of feed is regulated by withdrawing the pin $d$ from its advanced position by advancing the bar L, which advances the head N and reduces the bearing-surface between the inclines $n$ and $o$, allowing the spring P to act and advance the block O, reducing the bearing of the incline $o'$ on the incline $p$, so that the sliding pin D will recede, and when the desired point of adjustment is reached for the pin $d$ the bar L is locked stationary, holding the pin $d$ firmly in position to have the acting-face of the cam E act against the pin $d$. The farther back the pin $d$ is placed the longer the engagement between the clutch-disks A B, as the incline $e$ has to travel farther before engaging the pin $d$ to withdraw the disk A, and when the pin $d$ is drawn entirely back and lies within the countersink of the disk B, as in Fig. 1, its position is such that the end $e'$ will run clear of the pin $d$, so that no engagement is had between the pin $d$ and cam E, and the disks A B will revolve continuously together.

The rotation of the clutch-disk B drives the gear J, and this gear J, through the gear-pinion $k$, drives the feed-screw K and advances the cutter-head, and the distance of each advance of the cutter-head will be governed by the length of engagement between the clutch-disks A and B, a short feed being had when the pin $d$ is near the limit of its forward movement, and a gradually-increased feed being had as the pin $d$ is receded, the limit of the backward movement producing a continuous feed. It will thus be seen that the length of feed is controlled by the position of the pin $d$ in relation to the face of the cam E, and the pin $d$ can be readily adjusted to any point desired by moving the sliding pin D forward or back by its adjusting devices.

In use the bar, with the feed-regulating devices attached, is properly set in a lathe by the centers $i$ and $i'$ and the lathe-centers, and the sliding pin D is advanced to set the pin $d$ and hold the clutch-disk A out of engagement with the clutch-disk B, so that the disk will run empty while setting the cut. The plate H, driven from the face-plate or other moving part of the lathe, drives the disk A, and this disk, through the engagement of the teeth $a$ and $b$, drives the disk B and gear J to operate the screw-feed and advance the cutter-head, as already described. After the adjustment for the feed is once had no further attention is required, as with each engagement of the clutch-disks A and B the feed will be operated.

As shown, the bar I is stationary and the work is revolved around it; but it is evident that the bar can be revolved in the work and the operation of the feed will be the same, and with a revolving bar the clutch-disk A and cam E are locked stationary and the pin $d$ is made to revolve.

The clutch-disk B has secured thereto a band, Q, of a width sufficient to extend over and cover the teeth of the clutch-gear A when opened to its greatest extent to be entirely clear of the disk B, and this band Q forms a hood or guard which keeps the cuttings, dust, or other material from entering and filling the clutch to render it non-engaging or throw it out of use.

As shown, the tail end of the feed-screw K has secured thereto a bevel-gear, R, the bar I having a suitable recess for the gear to operate, and with this bevel-gear R meshes a bevel-gear, S, on a shaft, T, the end of which shaft enters a hole in the bar I, located at the proper point for the gears R and S to mesh, and the outer end of this shaft has a handle or arm, U, by which the shaft T can be turned to revolve the gear S, which turns the gear R and revolves the feed-screw K backward to run the cutter-head back on the bar at the completion of the cutting operation. The shaft T is removable with the gear S, and is only used when it is required to reverse the feed-screw for any purpose, and to reverse the rotation of the feed-screw all that is required is to slip the shaft T in the hole therefor in the bar I for the gear S to mesh with the gear R and to turn the shaft in the direction to reverse the rotation of the feed-screw.

What I claim as new, and desire to secure by Letters Patent, is—

1. The combination of the disk A, having the teeth a, and cam E, with the disk B, having the teeth b, and an adjustable contact-pin for the cam E, for engaging and disengaging the disks A B, substantially as and for the purposes specified.

2. The combination of the disk A, having the teeth a, and cam E, with the disk B, having the teeth b, and sliding rod D, carrying a contact-pin for the face of the cam E, substantially as and for the purposes specified.

3. The combination of the disk A, having the teeth a, cam E, sliding block F, with pin f, and spring G, with the disk B, having teeth b, and sliding rod D, having a contact-pin for the face of the cam E, substantially as and for the purpose specified.

4. The hollow spindle C and sliding rod D, having a pin, d, in combination with the clutch-disks A B and cam E, substantially as and for the purposes specified.

5. The hollow spindle C, sliding pin D, with pin d, sliding block F, with pin f, and spring G, in combination with the clutch-disks A B and cam E, substantially as and for the purposes specified.

6. The combination, with a feed-screw and a driving-gear therefor, of two clutch-disks, a cam, and a contact-pin for the cam for regulating the travel of the feed, substantially as specified.

7. The combination, with a feed-screw and a driving-gear therefor, of a movable rotating clutch-disk and a stationary clutch-disk for giving the desired feed, substantially as specified.

8. A driving clutch-disk and a driven clutch-disk, in combination with a cam and an adjustable contact-pin for the cam for regulating the travel of a feed-screw, substantially as specified.

SAMUEL A. BRUMBAUGH.

Witnesses:
  O. W. BOND,
  LOUISA BRUMBAUGH.